(12) United States Patent
Platt

(10) Patent No.: US 11,176,844 B2
(45) Date of Patent: Nov. 16, 2021

(54) IMMERSIVE MULTIMODAL MOTION SIMULATOR

(71) Applicant: Curtis D. Platt, Aliso Viejo, CA (US)

(72) Inventor: Curtis D. Platt, Aliso Viejo, CA (US)

(*) Notice: Subject to any disclaimer, the term of this patent is extended or adjusted under 35 U.S.C. 154(b) by 377 days.

(21) Appl. No.: 16/382,859

(22) Filed: Apr. 12, 2019

(65) Prior Publication Data

US 2020/0327819 A1 Oct. 15, 2020

(51) Int. Cl.
*G09B 9/14* (2006.01)
*G09B 9/30* (2006.01)

(52) U.S. Cl.
CPC ............... *G09B 9/14* (2013.01); *G09B 9/302* (2013.01); *G09B 9/307* (2013.01)

(58) Field of Classification Search
CPC ... G09B 9/02; G09B 9/04; G09B 9/08; G09B 9/14; G09B 9/30; G09B 9/302; G09B 9/307
See application file for complete search history.

(56) References Cited

U.S. PATENT DOCUMENTS

| 2003/0224333 | A1* | 12/2003 | Vastvedt | G09B 9/165 |
| | | | | 434/29 |
| 2019/0009175 | A1* | 1/2019 | Buxton | G09B 9/04 |
| 2020/0111381 | A1* | 4/2020 | Tang | G09B 9/14 |

* cited by examiner

*Primary Examiner* — Timothy A Musselman

(57) ABSTRACT

Disclosed is an immersive multimodal ride simulator comprising a virtual reality unit for delivering audio-visual simulation of a ride experience to a user, a motion unit for delivering motion simulation of the ride experience to the user wherein, the motion unit comprises a user cockpit, the exterior of which being at least partially rounded, the cockpit comprising an extension member extending therefrom, and a cradle comprising a plurality of omnidirectional load-bearing units. The cradle receives the cockpit such that, the conveyor units permit the 3D rotational movement of the cockpit. The simulator further comprises an actuation assembly for imparting rotational motion to the extension member resulting in the cockpit being subjected to three-dimensional rotation and imparting vertical motion to provide vertical movement. A controller assembly enables the user to interact simultaneously with the audio-visual simulation and motion simulation actuators without having to directly interface to the motion simulation software.

5 Claims, 12 Drawing Sheets

IMMERSIVE MULTIMODAL MOTION SIMULATOR

CROSS-REFERENCE TO RELATED APPLICATIONS

This application claims priority to U.S. Provisional Application No. 62/657,011 entitled "Immersive Multimodal Motion Simulator" filed Apr. 13, 2018, which is hereby incorporated by reference in its entirety.

TECHNICAL FIELD

The present disclosure generally relates to vehicular motion simulators and more particularly to an improved, low-cost, immersive multimodal motion simulator that eliminates simulation software interface between user controls and motion simulation.

BACKGROUND

Proper training is critical for mastering any skill. For example, learning to drive an automobile is a complex skill requiring a substantial amount of practice. Teenagers' lack of driving experience, together with risk-taking behavior, puts them at heightened risk for crashes. Even with current day training approaches, motor vehicle crashes are the leading cause of death for U.S. teens. The crash risk of newly licensed teens is particularly high during the first months of licensure. The crash rate per mile driven is 3 times higher for 16-17-year-old as compared to 18-19 year olds. In 2013, young people ages 15-19 accounted for $10 billion of the total costs of motor vehicle injuries. Thus, the loss of human life and need for improved training cannot be overstated.

Unfortunately, the increasing use of conventional driving simulators with one to three standard computer monitors has revealed various problems with managing, optimizing and verifying the educational process. For example, a computer-generated world is presented to the driver in a less-than-immersive two-dimensional environment for the driver interact with this world. More recently, static 3D virtual reality headsets have been employed where one drives through the computer-generated world as if seated in a real car and where one interacts with other traffic participants and the road infrastructure, but without motion. The lack of physical motion within a virtual reality environment can create a sensory mismatch (e.g., the body's visual sensors sense movement, yet the body's physical sensors sense no movement).

Thus, the immersion that conventional static virtual reality provides is one of its bestselling points—and biggest drawbacks. Motion sickness is a common side effect of virtual reality (VR), where the brain has trouble reconciling the movement the eyes are seeing with the lack of motion the body is feeling. This is where vehicular motion (or ride) simulators come in. However, legacy motion simulators in the art are not without the shortcomings of their own either.

Vehicular motion simulators known in the art can be very complex and expensive to the point that a simulator can take as long to build and cost as nearly as much as the vehicle it is simulating. The cost and complexity is incurred from both the hardware and software of the simulators. On the hardware front, today's simulators employ components such as, stators, fluid bearings, magnetic bearings, rollers, gear-ratcheting mechanisms, etc., which are not only expensive to begin with but are also unreliable. The unreliability aspect translates into substantial maintenance costs.

Importantly, the mechanism for transferring motion to the motion simulator or cockpit have been very complex, dangerous, expensive and prone to breakdown. Most commonly a simulator has been mounted on three to six 1000 to 3000 PSI high pressure hydraulic cylinders. Other simulators can use expensive electromechanical cylinders or motored drive wheels or castered wheel arrangements for movement transmission.

Our novel design utilizes the concept of a portion of a sphere cockpit sitting on a plurality of omni-directional load-bearing and non-force generating components. In a preferred embodiment this omni-directional load-bearing components are simple, inexpensive ball transfer bearings most commonly found in the gangway surfaces that load cargo onto aircraft. They are extremely robust and very inexpensive. Thus, these bearings allow the motion of the cockpit sphere like structure with the movement of simple, nearly indestructible bearings. Most notably the omni-directional bearing components are solely load-bearing and are not force generating. In other words, the cockpit bearings that allow the cockpit to move, do not impart the actual force needed for movement. The actual drive mechanism can be a much simpler and less expensive non load-bearing construction, such as a pneumatic cylinder, which further decreases the cost, complexity, and maintenance of such prior art systems.

There exists prior art that uses a combination of a sphere and omni-direction bearing components, usually Omni or Mecanum type wheels. Omni or Mecanum type wheels are a collection of many wheels place around the circumference of a single large wheel. This allows for omni directional or movement in every direction without castering. These wheels are load bearing and also force generating components; in other words, the wheels bear the weight of a sphere like cockpit as well as they drive or move the cockpit. This undesirable arrangement leads to complex and unreliability. Omni and Mecanum type wheels have an extremely high number of moving parts, sometimes as high as 10-20 per wheel. An Omni or Mecanum type wheeled simulator design typically use 3 or more. Therefore, there is 10-20 times 3 which equals 30 to 60 points of failure. This then is increased the more load and force is placed upon the wheel.

On the software front, even for a mono-modal simulator (i.e., a simulator configured to simulate a single type of vehicle), a substantial portion of the simulation software is written to translate user controls into motion simulation cues. The software expenses are multiplied if the simulator is designed to be multimodal (i.e., a simulator configured to simulate multiple types of vehicles) as the software configuration thereof entails writing motion cues for each type of vehicle. This expense is one of the reasons why simulators are strictly limited to be mono-modals thereby ultimately limiting the versatility and usability thereof.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

An embodiment of the present disclosure comprises an educational, immersive motion simulator capable of simulating various types of vehicular ride experiences at a lower cost by, among other things, eliminating custom simulation software access or interface between user controls and motion simulation. As a result, output from the user controls is duplicated and transmitted to the simulation software and to actuator assembly (or the like), which is responsible for motion simulation. The vehicular ride experiences pertain to all kinds of motorized road vehicles, rail vehicles, flight vehicles, water-borne vehicles, bicycles, etc. The simulator is configured to run any commercial-off-the-shelf (COTS) simulation software readily.

The simulator is broadly categorized into three components: (1) a Virtual Reality (VR) unit for delivering interactive audio-visual simulation of a ride experience to a user; (2) a motion unit for delivering interactive motion simulation of the ride experience to the user; (3) a controller assembly for enabling the user to interact with (and control) both the audio-visual and motion simulations directly and individually, while both the simulations complement each other. Notably, the user experiences motion simulation as the motion unit, which, as enabled by the controller unit and the actuation assembly, is subjected to pitch, roll, yaw and heave. As will be apparent from the following body of text, the simulator is configured such that, the controller unit is disposed in direct operative communication with the non-load bearing actuation assembly by eliminating software simulation interface there between. This renders the simulator simple in construction and inexpensive.

The VR unit comprises a VR headset and a pair of audio headphones connected to the VR headset. While the VR headset delivers a visual simulation of the ride experience to the user, the headphones deliver auditory simulation of the same. The motion unit comprises a cockpit and a cradle for rotating the cockpit therewithin. The cockpit comprises, for example, a hemispherical structure with the top and bottom surfaces thereof being flat and rounded respectively. Centrally-disposed within the cockpit is a rectangular cabin, within which, a cockpit seat is located for seating the user. The cockpit further comprises an extension member rigidly extending therefrom. The extension member comprises a vertical section extending centrally from the bottom of the cockpit and a horizontal section extending rigidly from the free extremity of the vertical section. The cradle comprises a framed member including a horizontal hexagonal frame supported by a plurality of legs, which serve at the load bearing element of the system. The inner side of the hexagonal frame is fitted with a plurality of omnidirectional load-bearing transfer units. The cockpit is received within the cradle such that, the transfer units contact the hemispherical exterior of the cockpit. The motion unit further comprises a wall surrounding the cradle. The arrangement of the omnidirectional load-bearing transfer units may also be in other various geometric patterns other than horizontal or vertical, possibly a combination or both, or in a lattice type arrangement.

The actuator assembly comprises a plurality of rotational actuators, wherein each rotational actuator is configured to impart one of pitch, roll and yaw to the cockpit. Notably, the omni-directional load-bearing units allow the cockpit to be freely rotated within the cradle as the cockpit is subjected to three-directional rotation by the actuator assembly. An actuator comprises, for example, a non-load bearing piston-cylinder arrangement, which when activated causes the piston at a default mid position to either extend from or retract into the cylinder. Notably, the length of an actuator extends between a piston extremity and a cylinder extremity. The plurality of rotation actuators (e.g., lower duty/lower cost non-weight bearing) comprises a pitch actuator, a roll actuator and a yaw actuator that subject the cockpit to pitch, roll and yaw respectively. The extremities of the rotational actuators are secured, for example, by ball & socket joints so as to permit the relative movement thereof with respect to the extension member. More particularly, the cylinder extremities of the rotational actuators are secured to the inner surface of the wall by means of the aforementioned ball & socket joint. The piston extremities of the pitch and roll actuators are secured at the bottom of the vertical section, while the piston extremity of the yaw actuator is secured to the free extremity of the horizontal section.

As the pitch actuator is activated, the extension and retraction of the piston causes the cockpit to tilt back and forth or vice versa thus simulating a pitch. Similarly, as the roll actuator is activated, the extension and retraction of the piston causes the cockpit to tilt side wards, thus simulating a roll. A combination of the pitch and tilt actuators can produce a partial yaw movement. Optionally, a 3rd axis yaw actuator can be included, and when activated, the extension and retraction of the piston causes the cockpit to rotate with an extended range about the central vertical axis thus simulating a yaw. The actuator assembly may optionally further comprise a plurality of vertical heave actuators, the cylinder and piston extremities of each of which about the ground and the bottom extremity of a leg respectively. As the heave actuators are simultaneously or otherwise activated, the extension and retraction of the piston causes the cradle and thereby the cockpit to be elevated and lowered respectively, thus simulating a heave. In addition, a partial combination can, for example, increase the tilt range of the inventive system.

The controller assembly comprises an interchangeable modular setup of controls that enable the user to interact with and control the audio-visual and motion simulation. An example of a controller assembly for an automobile ride simulation could comprise a steering wheel, a gear rod and a plurality of foot pedals. Another example of a controller assembly for an aircraft simulation. The simulator is configured such that, each controller assembly is easily replaceable with another.

The simulator is configured such that, the signals emanating from the controller assembly are directly relayed to the actuation assembly as opposed to said signals being run through the simulation software. Traditional relaying control from the simulation software to the actuator assembly is of great disadvantage. To obtain control from the simulation software almost always require permission from the authors of the simulation software and more often the simulation software has to written specifically for this control transfer. The permission and licensing, as well as the customization of the simulation software is usually cost prohibitive. So there is great advantage to a system that eliminates the software simulation interaction. To eliminate simulation software involvement one embodiment employs dual potentiometers in the controller assembly that mechanically split the signals therefrom into media and motion signals. While the media signal is relayed to the simulation software, while the motion signal is relayed to the actuator assembly. Notably, the motion signal is converted into a digital signal before being fed into an analog signal by a simple inexpensive micro controller, which in turn relays and amplifies the output thereof to the actuator assembly so as to initiate motion simulation. A second arrangement is for the signals emanating from the controller assembly are directly related to the operating system of the computer running the software simulation (as opposed to said signals being run through the software simulation). The operating system software then sends signals out to the actuator assembly so as to initiate motion simulation.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figures—Reference Numerals

10—Immersive Multimodal Ride Simulator
12—VR Headset
14—Headphones
16—User
18—Cockpit
20—Cabin
22—Seat
24—Door
26—Cradle
28—Hexagonal Frame
30—Leg
32—Omnidirectional Load Bearing Transfer Units
34—Upright Member
36—Wall
38—Pitch Actuator
40—Roll Actuator
42—Yaw Actuator
44—Extension Member
46—Heave Actuator
48—Piston
50—Cylinder
52—Retract Flow Port
54—Extend Flow Port
56—Ball & Socket Joint Embodiments of the present disclosure are explained in detail below with reference to the various figures. In the following description, numerous specific details are set forth to provide an understanding of the embodiments and examples. However, those of ordinary skill in the art will recognize a number of equivalent variations of the various features provided in the description. Furthermore, the embodiments and examples may be used together in various combinations.

Embodiments of the present disclosure are directed to an immersive ride simulator 10 (FIG. 1) capable of simulating various types of vehicular ride experiences that pertain to all kinds of two and four-wheeled motorized vehicles, rail vehicles, flight vehicles, water-borne vehicles, bicycles, etc., for training purposes. The simulator is broadly categorized into three components: a Virtual Reality (VR) unit for delivering interactive audio-visual simulation of a ride experience to a user, a motion unit for delivering interactive motion simulation of the ride experience to the user and a controller assembly for enabling the user to interact with (and control) both the audio-visual and motion simulations directly and individually, while both the simulations complement each other.

Notably, the user experiences motion simulation as the motion unit, which, as enabled by the controller unit and the actuation assembly, is subjected to pitch (i.e., rotation about a lateral axis), roll (i.e., rotation about a longitudinal axis), yaw (i.e., rotation about a vertical axis) and heave (i.e., vertical displacement). As will be apparent from the following body of text, the simulator is configured such that, the controller unit is disposed in direct operative communication with the actuation assembly by eliminating simulation software interface/communication therebetween. This renders the simulator simple in construction and inexpensive.

Figure 2A:
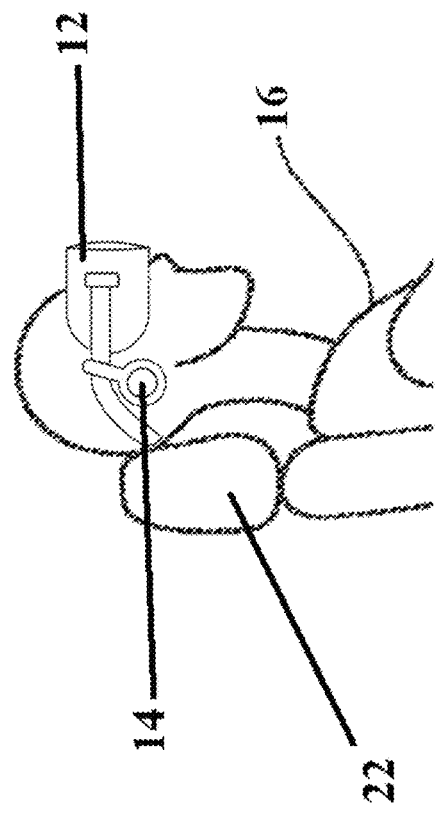
FIG. 2A illustrates a front elevation view of a user's head mounted with a VR unit, according to some embodiments.
Figure 2B:
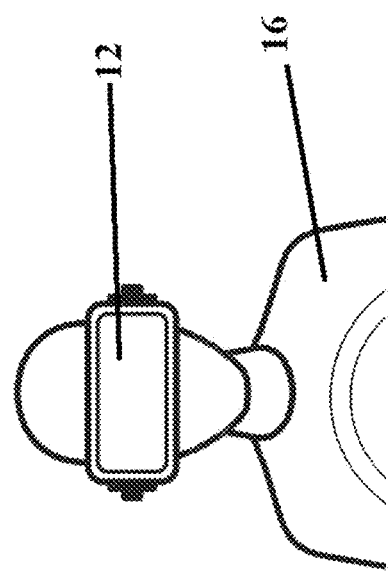
FIG. 2B illustrates a side elevation view of a user's head mounted with a VR unit, according to some embodiments.
Figure 2C:
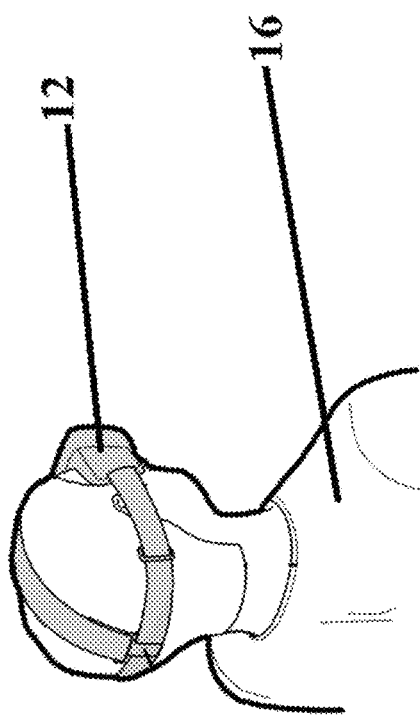
FIG. 2C illustrates a rear perspective view of a user's head mounted with a VR unit, according to some embodiments.

As can be appreciated from FIGS. 2A through 2C, the VR unit comprises a VR headset 12 and a pair of audio headphones 14 (or earphones) connected to the VR headset 12. While the VR headset 12 delivers a visual simulation of the ride experience to the user 16, the headphones 14 deliver auditory simulation of the same. In one embodiment, instead of the headphones 14, one or more external speakers may be employed for delivering the auditory simulation to the user 16. The VR headset 12 may employ a smartphone therein for running the simulation software resulting in the conveyance of the audio-visual simulation to the user 12 via the display thereof. In another embodiment, the VR headset 12 itself may inherently include a processor and display means for running the simulation software and rendering the corresponding audio-visual simulation respectively.

Figure 1:
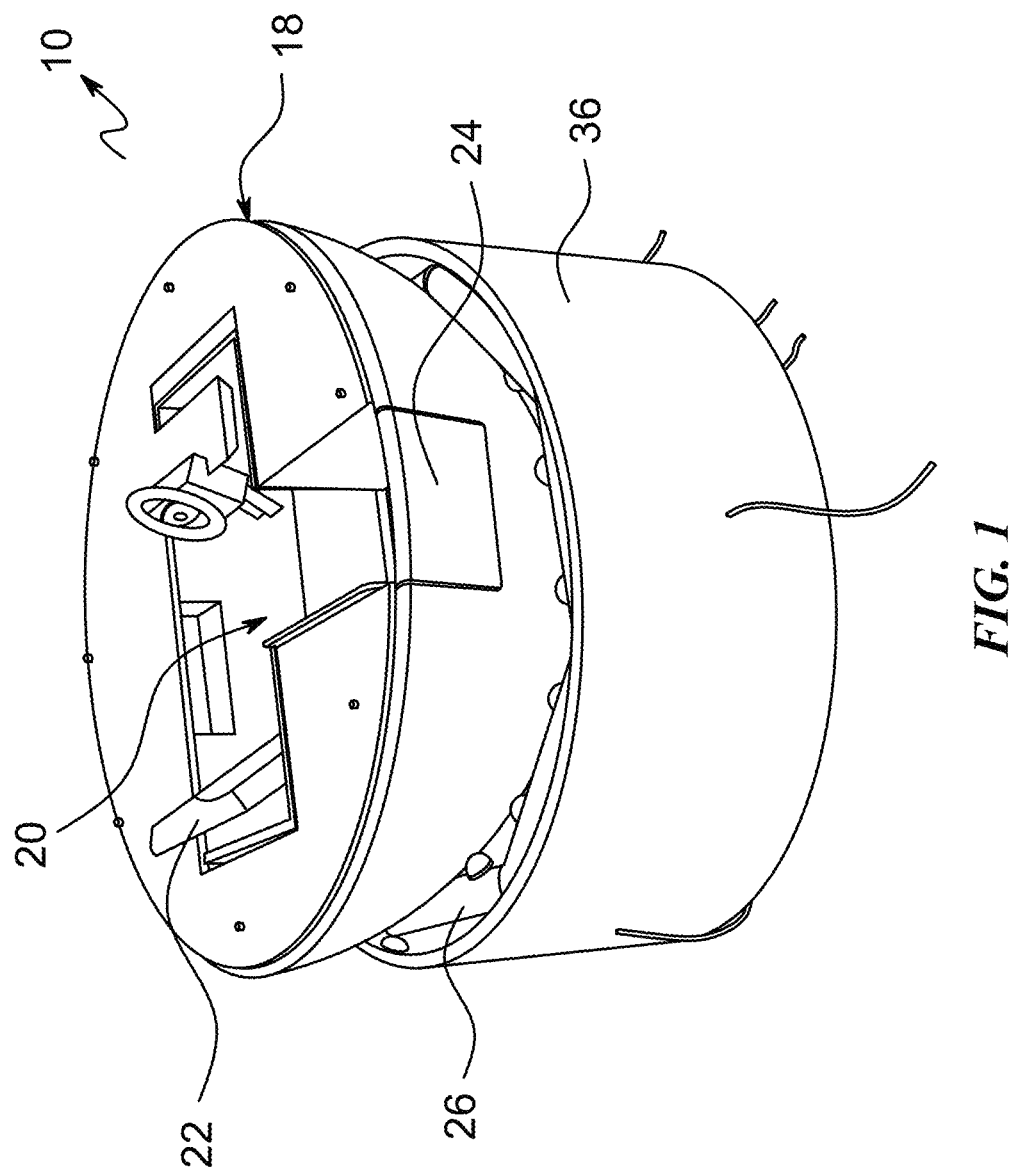
FIG. 1 illustrates a perspective view of the immersive multimodal ride simulator, according to some embodiments.

Referring to FIG. 1, the motion unit comprises a cockpit 18 and a cradle 26 (FIG. 3A) for rotatably receiving the cockpit 18 therewithin. The cockpit 18 comprises a rounded structure—preferably a hemispherical structure—with the top and bottom surfaces thereof being flat and rounded respectively. Preferably, the diameter of the hemispherical structure is between six and seven feet. Centrally-disposed within the cockpit 18 is a rectangular cabin 20, within which, a cockpit seat 22 is located for seating the user. As can be appreciated from the referred drawing, a door 24 defined on the circumference of the cockpit 18 that leads to the cabin 20. The seat 22 is interchangeably disposed within the cabin 20 so as to be replaced with, say, a dummy motorbike in the event of the vehicle being simulated is a motorbike. In another example, the seat 22 may be completely done away with and replaced with just a walking treadmill style platform in the event of the simulation pertains to, say, a gaming environment with an extraterrestrial terrain.

Referring to FIG. 1, the cockpit 18 further comprises an extension member 44 rigidly extending therefrom. The extension member 44 comprises a vertical section extending centrally from the bottom of the cockpit 18 and a horizontal section extending rigidly from the free extremity of the vertical section. In one embodiment, extension member 44 is disposed atop the cockpit 18 by means of a plurality of support rods extending between the extension member 44 and the cockpit. The utility of the extension member 44 will become apparent from the following body of text.

Figure 3A:
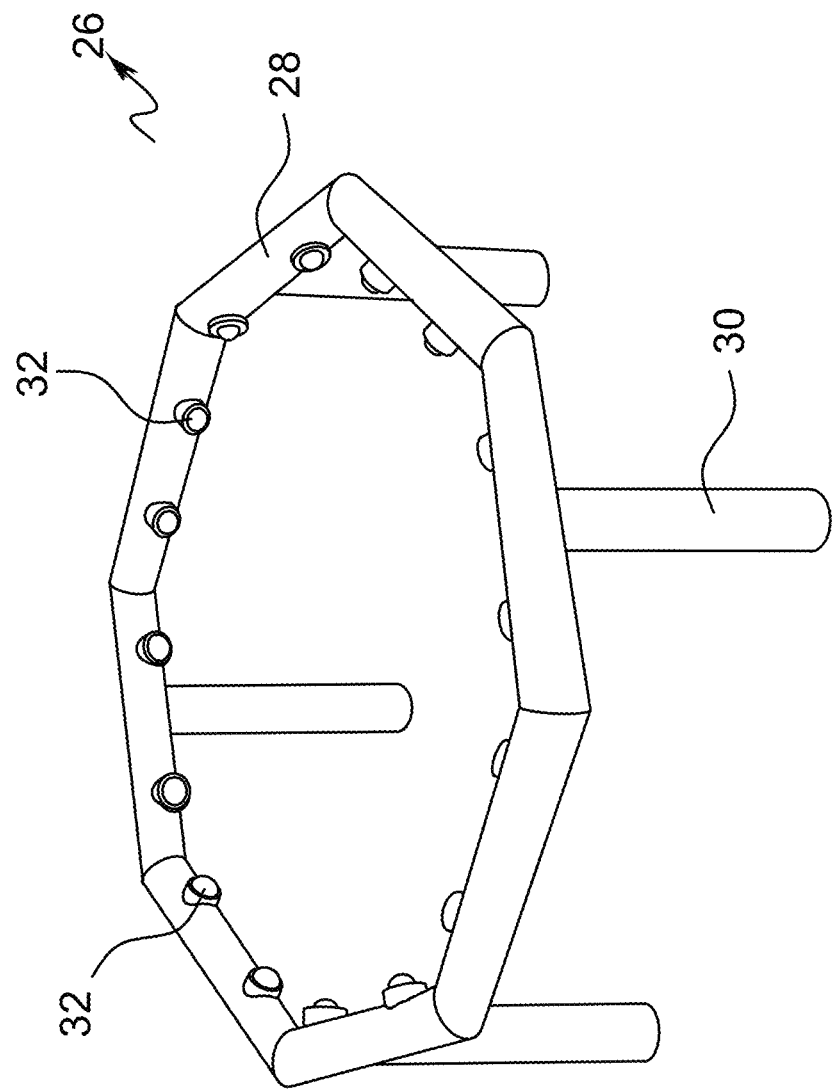
FIG. 3A illustrates a perspective view of a motion unit, according to some embodiments.

Referring to FIG. 3A, the cradle 26 comprises a framed member including an annular, horizontal, regular hexagonal frame 28, which is supported by a plurality of legs 30. The inner side of the hexagonal frame is fitted with a plurality of omnidirectional ball transfer units 32 such that, the ball transfer units 32 are equidistant with respect to one another. In one embodiment, a circular frame may be employed in lieu of the hexagonal frame 28. Notably, any annular regular polygonal frame may be employed as long as the functionality thereof is not compromised. Preferably, anywhere between 20 and 30 ball transfer bearings are used as the omnidirectional load bearing transfer units. In one embodiment, as can be appreciated from FIG. 3B, the hexagonal frame comprises a plurality of integral, slightly-curved, upright support members 34 (preferably four) that equidistant with respect to each other. The inner side of each upright member is fitted with a plurality of ball transfer bearings 32. In one embodiment, Mecanum wheels ban be employed in lieu of omnidirectional load-bearing transfer units 32. Another embodiment, the ball transfer bearings are supported on elastomeric material, springs or actuators that allow the balls to remain in contact with the load surface for proper distribution of force. Small defects or tolerances in the load surface can lead to discrepancies in the uniformity of the load bearing surface. Elastomeric, springs or actuators helps to ensure no one ball transfer unit carries a disproportionate load.

Figure 3B:
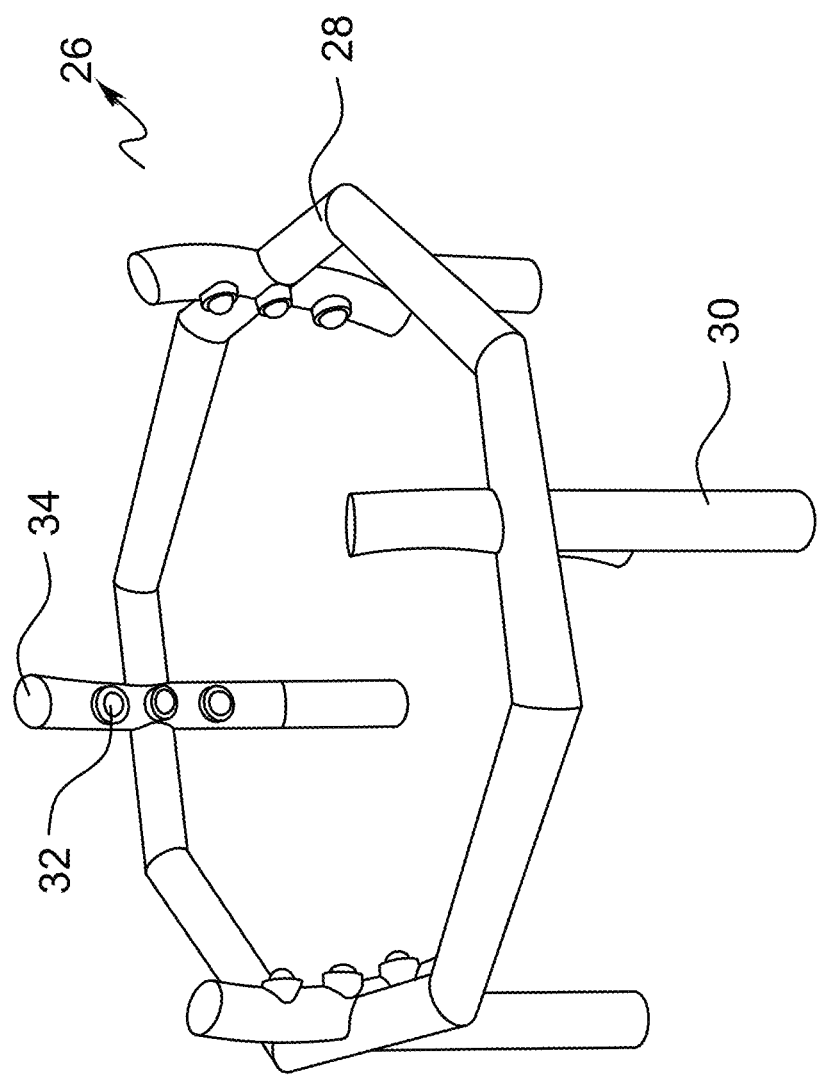
FIG. 3B illustrates a front perspective view of a hexagonal motion unit, according to some embodiments.

Referring to FIGS. 3A and 3B, the cockpit 18 is received within the cradle 26 such that, the bearing surface of the omni-directional load-bearing of the ball transfer units 32 abut the hemispherical exterior of the cockpit 18. In one embodiment, each ball transfer unit 32 comprises springloaded units allowing the ball to automatically adjust to the variations and imperfections in the hemispherical contour of the cockpit 18. The motion unit, as can be appreciated from FIG. 1, further comprises a circular (or hexagonal) wall 36 surrounding the cradle 26. In the embodiment where the extension member 44 is disposed atop the cockpit 18, the wall 36 is also disposed atop the cockpit 18 such that, the wall 36 surrounds the extension member 44. The functional engagement between the wall 36 and the extension member 44 will become apparent from the following body of text.

Figure 4:
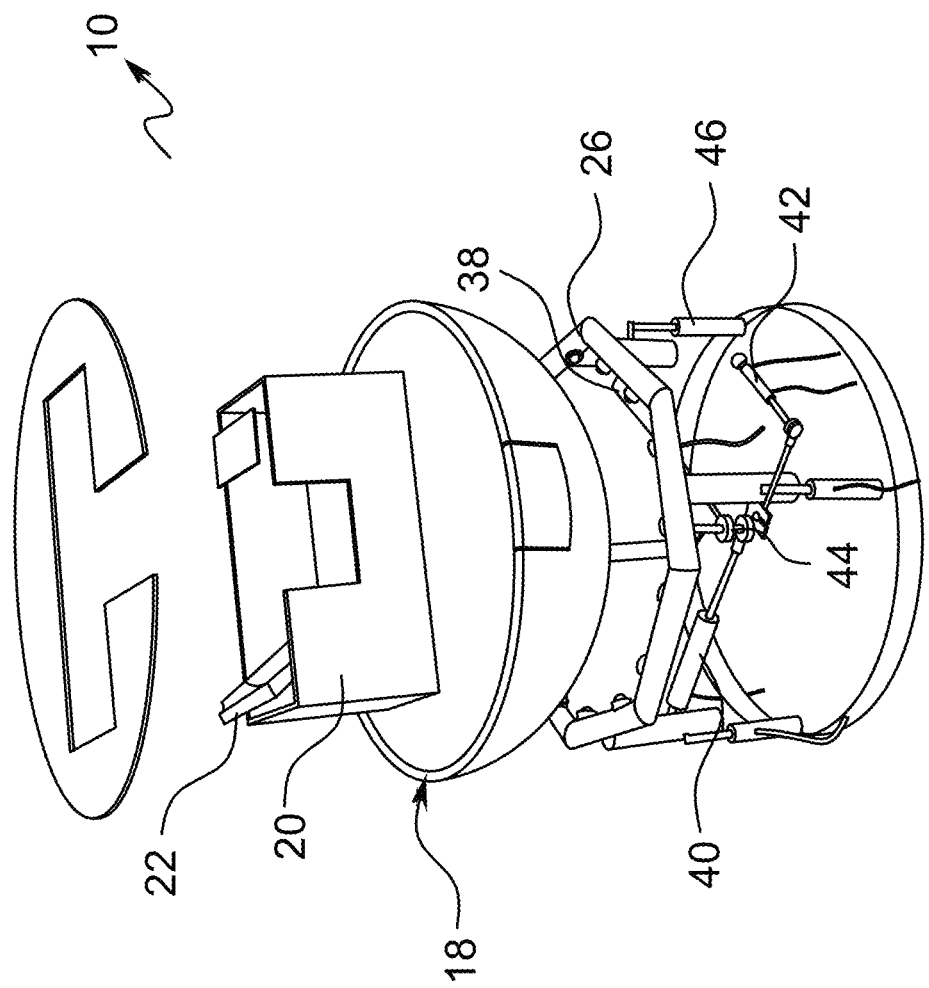
FIG. 4 illustrates an exploded view of the ride simulator, according to some embodiments.
Figure 5:
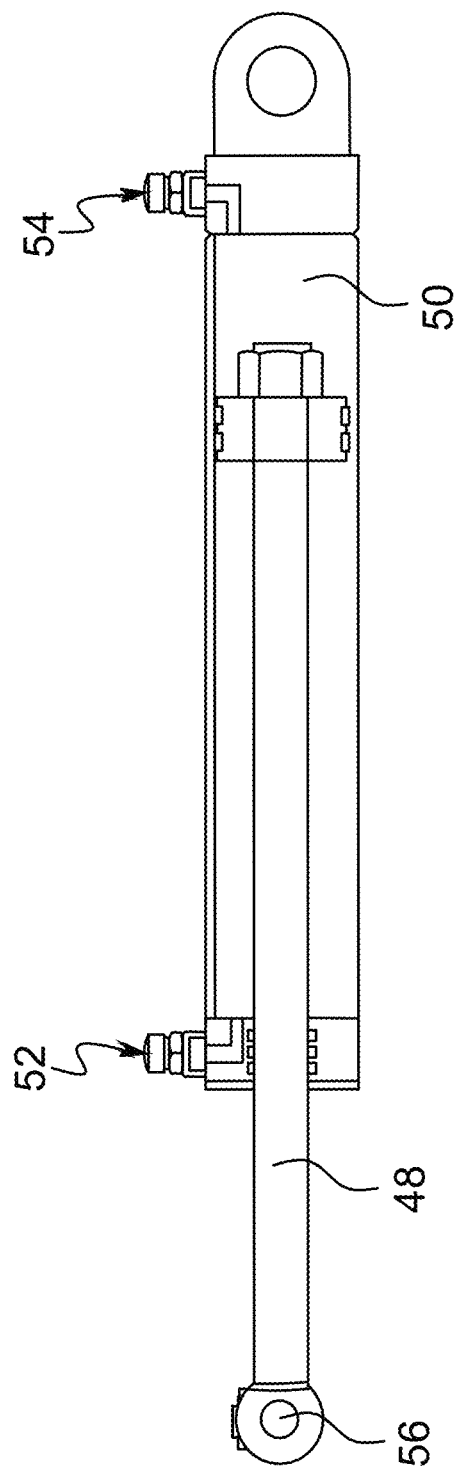
FIG. 5 illustrates a sectional view of the actuator, according to some embodiments.

Referring to FIG. 4, the actuator assembly comprises, for example, a plurality of light-duty pneumatic rotational actuators, wherein each rotational actuator is configured to impart one of pitch, roll and yaw to the cockpit 18. Notably, the ball transfer units 32 (FIGS. 3A and 3B) allow the cockpit 18 to be freely three-dimensionally rotated within the cradle 26 as the cockpit 18 is subjected to three-directional rotation (i.e., pitch, roll and yaw) by the actuator assembly. An actuator comprises a piston-cylinder arrangement, which when activated causes the piston 48 (FIG. 5) at a default mid position to either extend from or retract into the cylinder 50 (FIG. 5). Notably, the length of an actuator extends between a piston extremity and a cylinder extremity. As can be appreciated from FIG. 5, each cylinder 50 comprises a pair retract and extend flow ports 52 and 54 disposed at the opposing extremities thereon. The ports 52 and 54 help in enabling the piston 48 to slidably move and stay stationary within the cylinder 50.

Referring to FIG. 4, the plurality of rotation actuators comprises a pitch actuator 38, a roll actuator 40 and a yaw actuator 42 that subject the cockpit 18 to pitch, roll and yaw respectively. The extremities of the rotational actuators are secured by means of a ball & socket joint 56 that permit the relative movement with respect to the extension member 44. More particularly, the cylinder extremities of the rotational actuators are secured to the inner surface of the circular wall 36 (FIG. 1) by means of the aforementioned ball & socket joint 56. The piston extremities of the pitch and roll actuators 38 and 40 are secured at the bottom of the vertical section, while the piston extremity of the yaw actuator 42 is secured to the free extremity of the horizontal section.

Figure 6A:
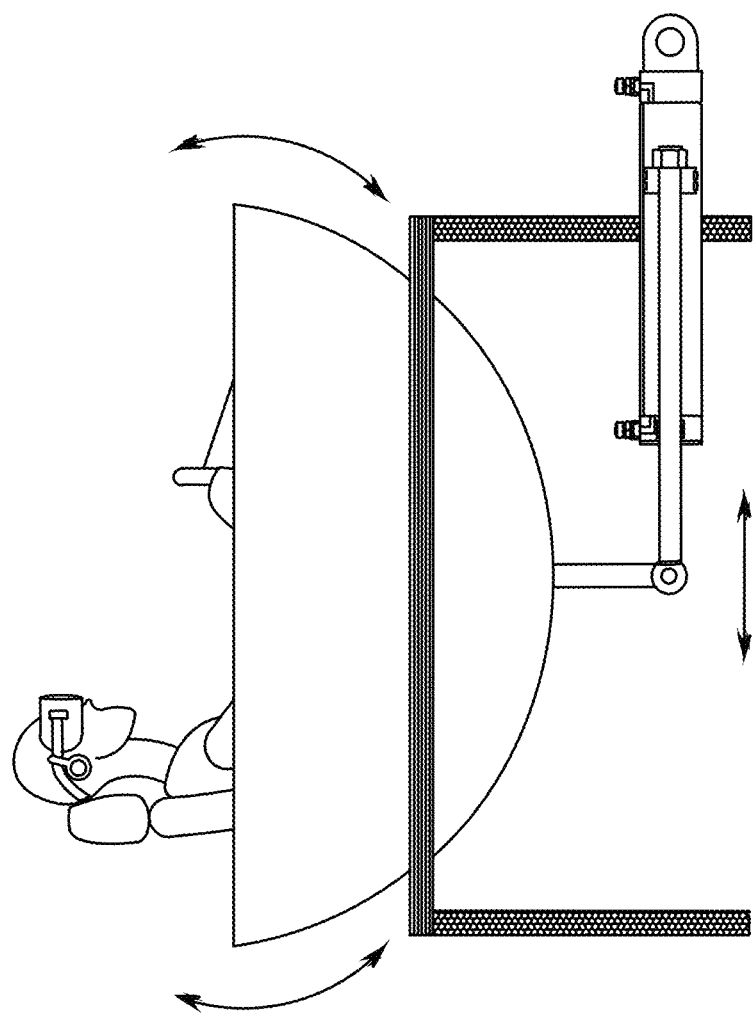
FIG. 6A illustrates a side elevation view of the user in the cockpit, according to some embodiments.
Figure 6B:
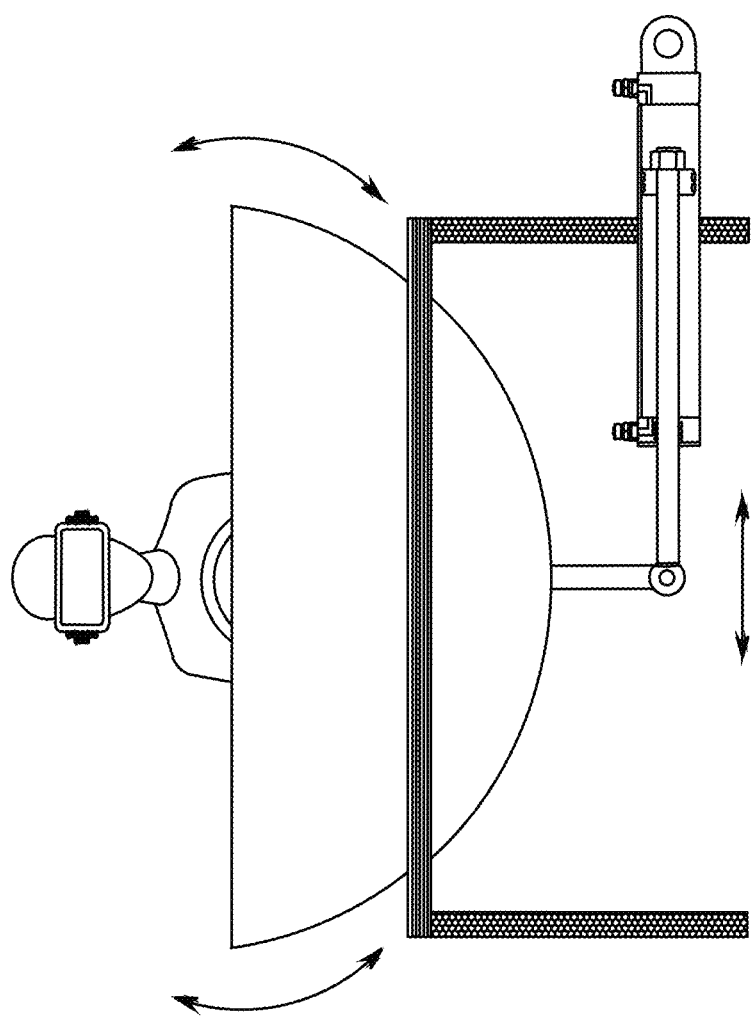
FIG. 6B illustrates a front elevation view of the user in the cockpit, according to some embodiments.

Referring to FIG. 4, as the pitch actuator 38 is activated by means of a stepper motor, the extension and retraction of the piston, by virtue of it being connected to the extension member 44, causes the cockpit 18 to tilt back and forth or vice versa (as seen in FIG. 6A) thus simulating a pitch. Similarly, as the roll actuator 40 is activated, the extension and retraction of the piston, by virtue of it being connected to the extension member 44, causes the cockpit 18 to tilt sidewards (as seen in FIG. 6B) thus simulating a roll. As the yaw actuator 42 is activated, the extension and retraction of the piston causes the cockpit 18 to rotate about the central vertical axis thereof thus simulating a yaw. In the embodiment where the extension member 44 is disposed atop the cockpit 18, the rotational actuators are connected to the extension member 44 in the similar fashion thus rendering the functionality thereof identical to that of what is taught in the aforementioned embodiment.

Referring to FIG. 4, the actuator assembly further comprises a plurality of vertically disposed pneumatic heave actuators 46. The cylinder and piston extremities of each heave actuator 46 abut the ground and the bottom extremity of a leg 30 (FIG. 3A) respectively. As the heave actuators 46 are simultaneously activated, the extension and retraction of the piston, by virtue of it being connected to the leg 30, causes the cradle 26 and thereby the cockpit 18 (and thus the entire simulator 10) to be elevated and lowered respectively thus simulating a heave. In one embodiment, the actuator assembly employs one or more heave actuators 46 to be disposed underneath the cockpit seat 22 (or underneath the aforementioned exemplary dummy motorbike, or the like). This enables just the seat 22 to be subjected to heave instead of the entire simulator 10. A potentiometer works in operative communication with each actuator so as to determine the position of the piston 48 with respect to the corresponding cylinder 50. The position of the piston 48 translates into the degree of pitch, roll, yaw and heave the cockpit 18 is subjected to.

Figure 7B:
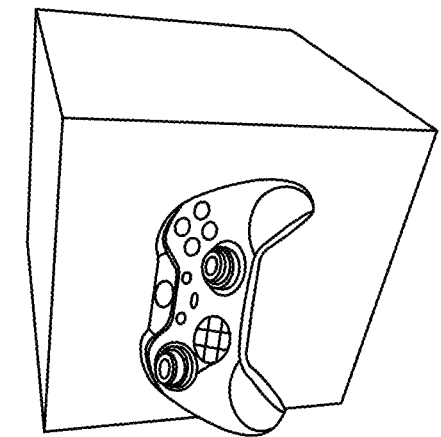
FIG. 7B illustrates a perspective view of a controller assembly, according to some embodiments.
Figure 7C:
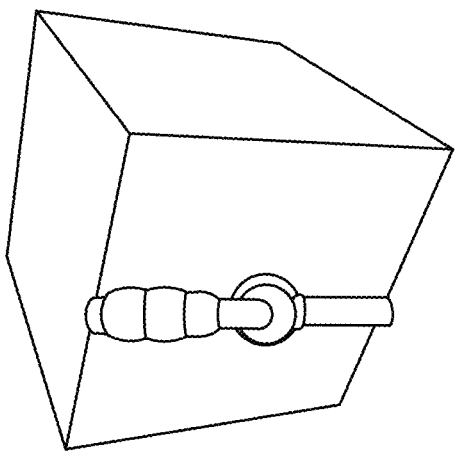
FIG. 7C illustrates a perspective view of a controller assembly, according to some embodiments.
Figure 7A:
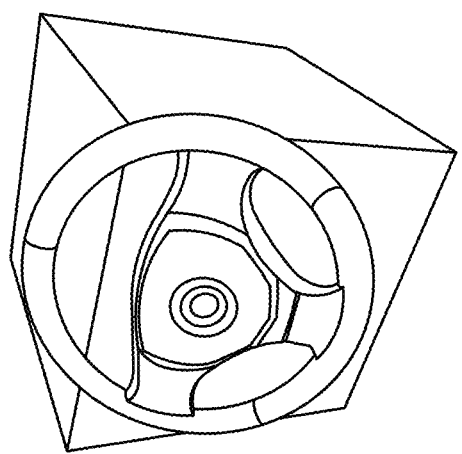
FIG. 7A illustrates a perspective view of a controller assembly, according to some embodiments.

The controller assembly comprises an interchangeable modular setup of controls as shown in FIGS. 7A through 7C that enable the user to interact with and control the audio-visual and motion simulation. An example of a controller assembly for an automobile ride simulation could comprise a steering wheel (FIG. 7A), a gear rod and a plurality of foot pedals. Another example of a controller assembly for a motorbike (or bicycle) ride simulation could be a handlebar with an accelerator, front brake and clutch controls and foot pedals for rear brake and gears. Yet another example of a controller assembly for an aircraft ride simulation could be controls employed in a conventional aircraft. Other examples of a controller assembly could be simple joystick and a controller pad as seen in FIGS. 7B and 7C. The simulator is configured such that, each controller assembly is, for example, easily replaceable by a simple latching arrangement.

Figure 8:
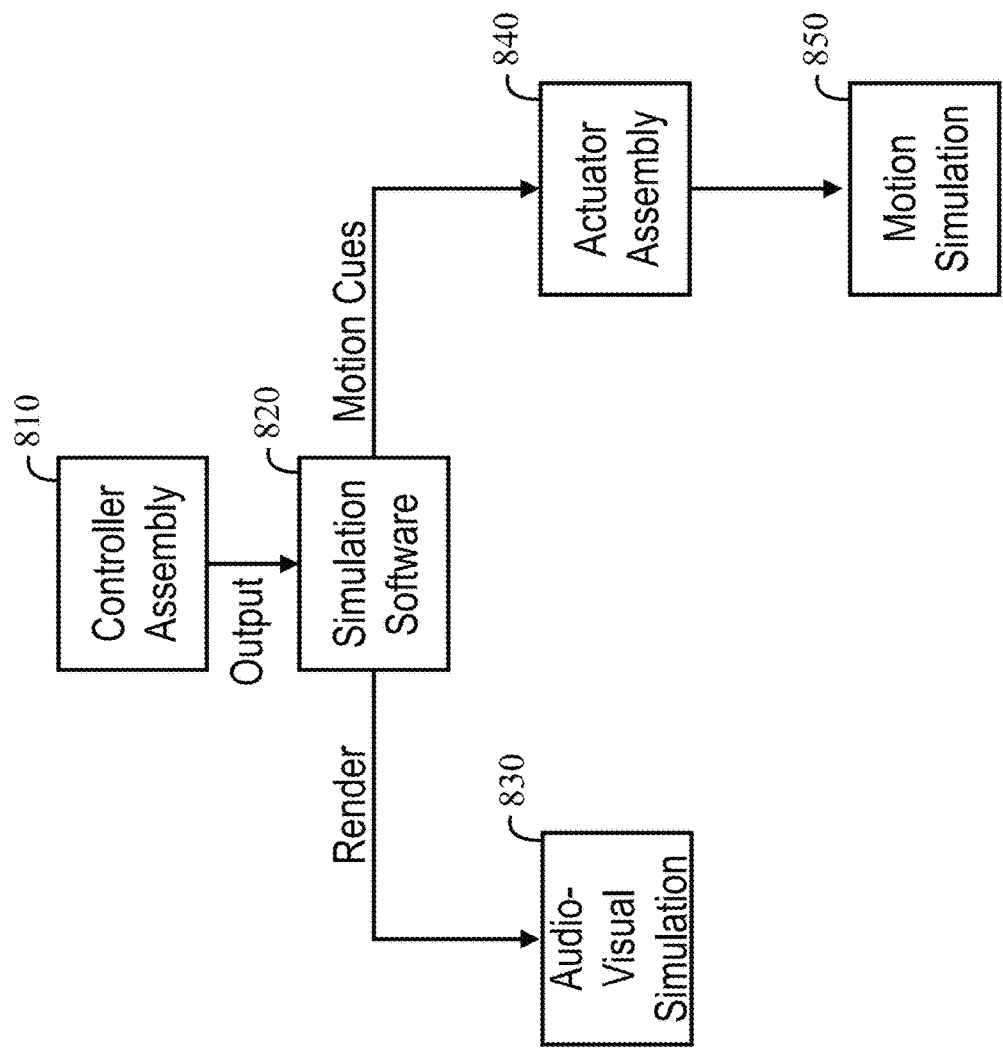
FIG. 8 illustrates a flowchart depicting the signal control method employed by traditional simulators for generating motion simulation.

The aspect of Interacting with and controlling the audio-visual simulation by means of controller (assembly) is fairly commonplace in the art. For example, steering the steering wheel of the controller assembly left results in the virtual automobile in the visual simulation being swerved left. However, as can be appreciated from FIG. 8, in the motion simulators known in the art, the controller signals emanating from the controller assembly 810 (by virtue of the user operating the controller assembly) are run through a computer's operating system that runs the simulation software 820 (which renders the interactive audio-visual simulation 830), which then interprets signals and relays corresponding motion commands to the motion simulator 850 (i.e., the actuator assembly). The motion simulator 850 then proceeds to execute the commands from the simulation software 820 resulting in motion simulation.

Figure 9:
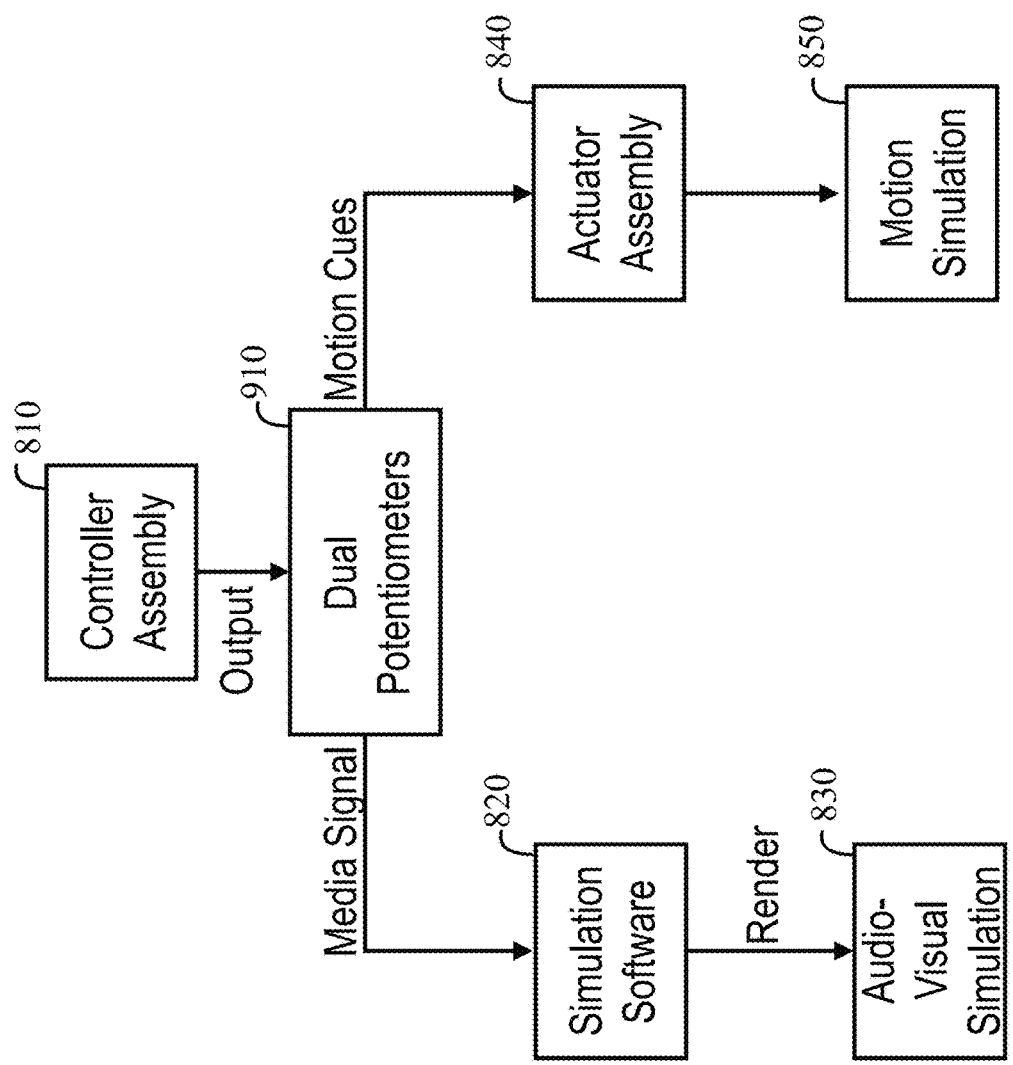
FIG. 9 illustrates a flowchart depicting the signal control method for generating motion simulation, according to some embodiments.

Referring to FIG. 9, the simulator of the present invention is configured such that, the signals emanating from the controller assembly 810 bypass the simulation software 820 and are directly relayed to the actuation assembly 840 resulting in the cockpit being subjected to the pitch, roll, yaw and heave. In order words, the controller assembly 810 is disposed in direct communication with the actuation assembly 840 whereby, the actuators are controlled directly by the output signals from the controller assembly 810. More particularly, the controller assembly 810 employs, for example, dual potentiometers 910 that mechanically and/or electrically split the signals therefrom into media and motion signals. While the media signal is relayed to the simulation software while the motion signal is relayed to the actuator assembly 840. Notably, the motion signal is converted into a digital signal before being fed into a microcontroller, which in turn relays the output thereof to the actuator assembly 840.

Figure 10:
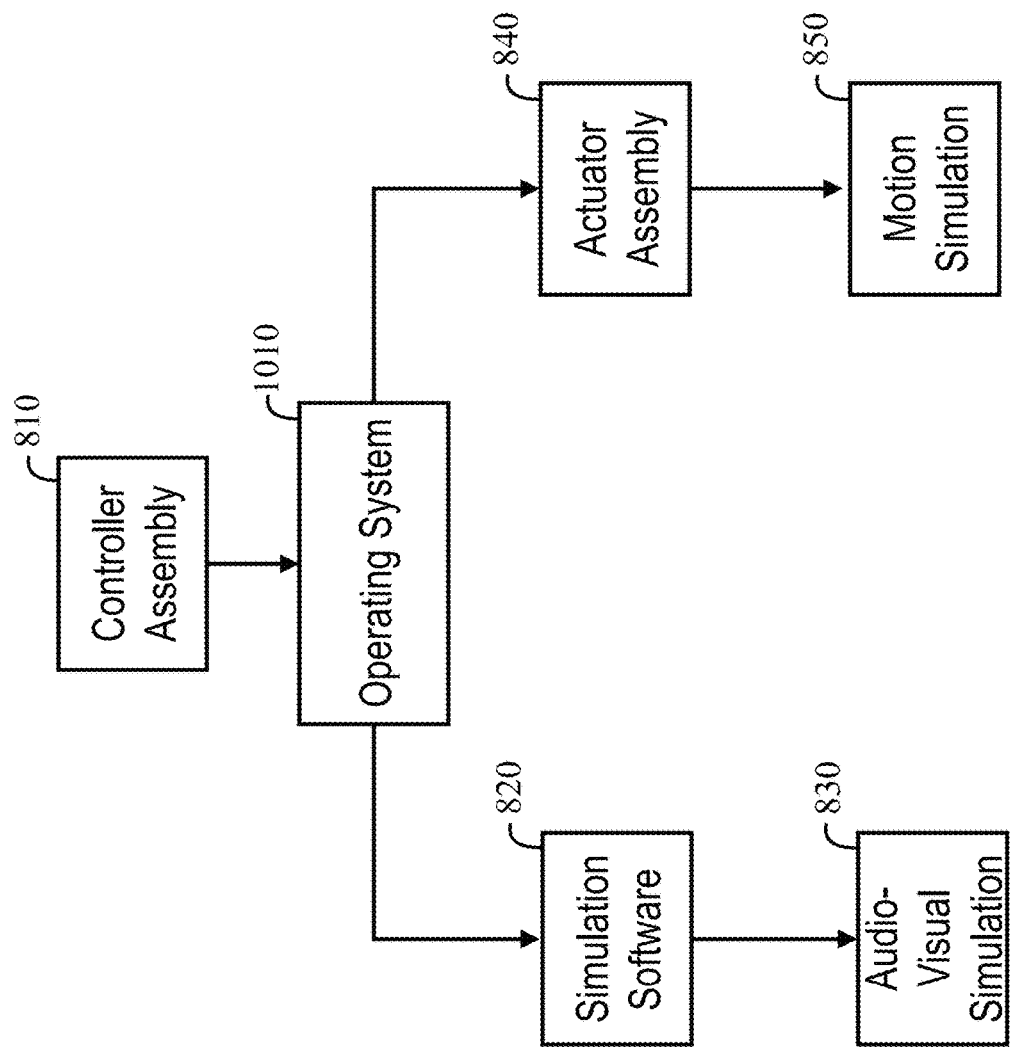
FIG. 10 illustrates a flowchart depicting the second signal control method for generating motion simulation, according to some embodiments.

In an alternative embodiment, the signals from the controller assembly 810 that are first passed on to the computer's operating system (whereon the simulation software is installed) are intercepted via a common subprogram or API running within the operating system 1010 (FIG. 10). Thereafter, the media signal continues to the simulation software 820, while the motion signals from the API directed to the actuator assembly. This embodiment still bypasses the need for a simulation software interface between the controller assembly and the actuation assembly.

Embodiments and examples are described above, and those skilled in the art will be able to make various modifications to the described embodiments and examples without departing from the scope of the embodiments and examples. For instance, the simulator can be used for entertainment purposes such as for example, playing racing-based VR video games.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

What is claimed is:

1. A motion simulator comprising a cockpit configured as a partial dome, inverted and supported by a cradle, the cradle comprised of a plurality of omni-directional load bearing units on the cradle's interior circumference to allow the cockpit to pivot in the cradle via a plurality of said bearing components.

2. The system of claim 1, wherein the omni-directional load bearing units are Mechanum type wheels.

3. The system of claim 1, wherein the omni-directional load bearing units are Omni type wheels.

4. The system of claim 1, wherein the omni-directional load bearing units are Hudson ball transfer bearing type wheels.

5. The system of claim 1, wherein the omni-directional load bearing units are mounted to a shock absorbing or self-leveling system or material.

* * * * *